(12) United States Patent
Bruns (10) Patent No.: US 11,285,057 B2
(45) Date of Patent: Mar. 29, 2022

(54) RETRACTOR RESTRAINT SYSTEM AND RELATED METHODS, SUCH AS FOR SECURING WHEELCHAIRS IN VEHICLES

(71) Applicant: AMF-Bruns GmbH & Co. KG, Apen (DE)

(72) Inventor: Gerit Bruns, Bad Zwischenahn (DE)

(73) Assignee: Bruns Holding GmbH & Co. KG, Apen (DE)

( * ) Notice: Subject to any disclaimer, the term of this patent is extended or adjusted under 35 U.S.C. 154(b) by 43 days.

(21) Appl. No.: 16/719,142

(22) Filed: Dec. 18, 2019

(65) Prior Publication Data

US 2020/0197244 A1  Jun. 25, 2020

(51) Int. Cl.
  *A61G 3/08* (2006.01)
  *B65H 75/48* (2006.01)

(52) U.S. Cl.
  CPC ......... *A61G 3/0808* (2013.01); *B65H 75/486* (2013.01)

(58) Field of Classification Search
  CPC .. B60P 7/0823; B60P 7/06; B60P 7/08; A61G 3/0808; B65H 75/486
  USPC .......................................................... 410/7
  See application file for complete search history.

(56) References Cited

U.S. PATENT DOCUMENTS 5,904,371 A * 5/1999 Koning ................. B60R 22/415
                                                    280/806
2003/0190208 A1  10/2003 Cardona et al.
2004/0026981 A1   2/2004 Maloney et al.
2008/0247837 A1  10/2008 Cardona
2014/0271019 A1   9/2014 Bell

FOREIGN PATENT DOCUMENTS

| CN | 110950194 A | * | 4/2020 | |
|---|---|---|---|---|
| DE | 102016117179 A1 | | 3/2018 | |
| GB | 2527120 A | * | 12/2015 | ........... A61G 3/0808 |
| GB | 2527120 A | | 12/2015 | |
| JP | 2009101125 A | | 5/2009 | |
| WO | 2017205696 A1 | | 11/2017 | |

OTHER PUBLICATIONS

German Patent Office, Search Report issued in DE 20 2018 107 283.8 dated Dec. 16, 2019, 5 pages.
European Patent Office, Search Report issued in EP 19216201.1-1113 dated May 18, 2020 (8 pages).

* cited by examiner

Primary Examiner — Hilary L Gutman
(74) *Attorney, Agent, or Firm* — Wood Herron & Evans LLP (57) ABSTRACT

A retractor restraint system is provided for securing wheelchairs and/or people in vehicles. The system includes a housing, a retractor reel mounted to the housing rotatably in a positive and a negative direction of rotation for receiving a belt which can be coupled to a wheelchair, an arresting unit for arresting the reel to prevent rotation in the negative direction of rotation in an operating state of the retractor restraint system, a clamping unit arranged at the housing for releasably clamping fast the belt unwound from the reel, and a triggering mechanism for actuation of the clamping unit. The triggering mechanism is coupled to the arresting unit and the reel in such a way that the clamping unit is actuated when a torque acts on the reel in the negative direction of rotation and the reel is arrested by the arresting unit.

14 Claims, 7 Drawing Sheets

RETRACTOR RESTRAINT SYSTEM AND RELATED METHODS, SUCH AS FOR SECURING WHEELCHAIRS IN VEHICLES

CROSS-REFERENCE TO RELATED APPLICATION

This application claims priority to German Application No. 20 2018 107 283.8, filed Dec. 19, 2018. The above-mentioned patent application is incorporated herein by reference in its entirety.

TECHNICAL FIELD

The invention relates to a retractor restraint system for securing wheelchairs and/or people in vehicles.

BACKGROUND

Retractor restraint systems of the kind set forth in the opening part of this specification are generally known. They are used for securing wheelchairs and/or people in vehicles. In that situation such a retractor restraint system is fixed to the vehicle floor or to the vehicle wall, wherein the distal end of the belt which is wound on the reel can be coupled to a wheelchair or a safety belt buckle.

In addition for securing a person and a wheelchair it is possible to use two or more retractor restraint systems of the above-indicated kind, the distal ends of which can be respectively coupled to a belt buckle for securing a person or the wheelchair of the person to be secured.

In regard to securing wheelchairs in vehicles there are in that respect particular challenges by virtue of the required length of the belts. In particular the belts of the retractor restraint systems which are fixed to the front part of the wheelchair are frequently of a length of at least 3 meters, preferably even up to 4 meters. That length is required in order to be able to unwind the belts from the belt reel to such an extent that a wheelchair can be coupled to the belt outside the vehicle as the front region of the wheelchair is frequently not accessible in the vehicle.

High forces and acceleration effects can act on such retractor restraint systems like for example front retractor restraint systems for securing wheelchairs, in the event of an accident involving a rear-end impact and upon rebound as a consequence of a frontal impact.

In addition, when transferring a wheelchair to be secured into the vehicle, unintentionally releasing the wheelchair can result in the wheelchair moving quickly and abruptly back so that forces act on the retractor restraint system.

Particularly in the case of very long belts but also in relation to shorter belts as are used for securing people there is in that respect a considerable safety risk by virtue of comparatively great absolute belt stretch. In addition the above-described forces and acceleration effects mean that a negative torque further acts on the retractor reel, which in the arrested state of the retractor reel leads to the so-called film spool effect. That describes contraction of the belt wound on the retractor reel and the axial stretch thereof so that particularly in the case of an accident the belt yields to a considerable extent and endangers the safety of the occupants.

That yielding of the retractor restraint system is to be avoided in the event of an accident but also when transferring the wheelchair into the vehicle, both for reasons of comfort and also safety of the wheelchair user or a person.

Thus, it would be desirable to provide an improved retractor restraint system, such as a system affording enhanced safety and improved handling when securing wheelchairs and/or people.

SUMMARY

These and other technical objectives are achieved, in one embodiment, by providing a retractor restraint system that includes a housing, a retractor reel mounted to the housing rotatably to enable a positive direction of rotation and a negative direction of rotation, the retractor reel configured for receiving a belt which can be coupled to a wheelchair, the belt can be wound on by a rotation of the reel in the positive direction of rotation, the belt can be unwound by a rotation of the reel in the negative direction, an arresting unit for arresting the reel to prevent rotation in the negative direction in an operating state of the system, a clamping unit arranged at the housing for releasably clamping fast the belt unwound from the reel, and a triggering mechanism for actuation of the clamping unit. The technical objectives are achieved in part because the triggering mechanism can be coupled to the arresting unit and the reel in such a way that the clamping unit is actuated when a torque acts on the reel in the negative direction of rotation and the reel is arrested by the arresting unit.

Accordingly an embodiment of the invention proposes that the triggering mechanism actuates the clamping unit whenever the reel is arrested by the arresting unit and a torque acts in the negative direction of rotation. In that case the belt is clamped fast both in the case of unintended release of the wheelchair when transferring it into the vehicle and also in the event of an accident. By virtue of the belt being clamped in the unwound region the belt which is wound on the reel is decoupled from the flow of forces of the unwound belt. The absolute stretch of the belt is thus reduced as the acceleration effects and the forces only still act on a small part of the belt. Furthermore the film spool effect which leads to the belt being pulled out is avoided. In the case of an accident or also only unintended release of the wheelchair therefore yielding of the retractor restraint system is avoided and the belt reel is reliably arrested. Furthermore the mechanical loading of a reel and the arresting unit is reduced by the belt being clamped fast by the clamping unit so that the service life of the retractor restraint system is enhanced. This embodiment avoids any unwinding of the belt from the reel caused by a torque in the negative direction of rotation leading either to impairment of the level of comfort while the wheelchair is being transferred into the vehicle or while travelling, or an adverse effect in terms of safety of the wheelchair user in the event of an accident.

The term arresting unit in accordance with the invention is used to denote a unit which secures the reel to prevent rotation in the negative (unwinding) direction of rotation and prevents further unwinding of the belt, but at the same time allows rotation in the positive (winding-on) direction of rotation. If for example the arresting unit is already actuated when a wheelchair is being transferred into the vehicle in order to secure it to prevent it from rolling back winding of the belt on to the reel continues to be possible.

The term negative direction of rotation is used in dependence on the respective embodiment to denote the direction in which the belt is unwound by a rotation of the reel. A positive direction of rotation is equally to be understood as meaning the direction in which the reel rotates to wind on the belt.

A triggering mechanism in accordance with embodiments of the invention is a mechanism which can be coupled to the arresting unit and the reel mechanically or also in signal-conducting relationship or by a combination of both in order to actuate the clamping unit whenever a torque acts in the negative direction of rotation and the reel is in its arrested state.

According to an advantageous embodiment, the triggering mechanism is a mechanically actuatable triggering mechanism which is moveable from an operative position into a triggering position to actuate the clamping unit. A mechanically actuatable triggering mechanism ensures that the clamping device is reliably actuated in the event of an accident even upon an operational disturbance, in particular even a disturbance in signal transmission and electrical power supply of the entire vehicle. Furthermore mechanical actuation of the triggering mechanism which is moveable from an operative position into a triggering position is inexpensive and easy to maintain.

An advantageous development of embodiments of the invention provides a spring unit for resiliently coupling the reel to the arresting unit so that the reel in the arrested state is rotatable in a predefined region in the negative direction of rotation, wherein preferably the triggering mechanism is coupled with play to the reel in such a way that the triggering mechanism is moved relative to the reel from the operative position into the triggering position when the reel rotates in the arrested state in a predefined region in the negative direction of rotation. Such a spring unit permits a predefined rotation of the reel in the negative direction of rotation to avoid an overload on the retractor restraint system when the reel is arrested, for example in the event of an accident. By virtue of such a predefined rotation in the negative direction of rotation the reel continues to rotate until the clamping unit is actuated and the reel is definitively stopped in its movement by the arresting unit.

Preferably the triggering mechanism is mounted to the spring unit rotatably about an eccentric pivot and is moved by a rotation about the eccentric pivot into the triggering position when the reel rotates in the arrested state in a predefined region in the negative direction of rotation. Accordingly the triggering mechanism in a simple and compact structure is moveable by a rotary or pivotal movement about the eccentric pivot into the triggering position.

The term eccentric pivot is here used to denote a pivot point which does not coincide with that of the retractor reel. If the triggering mechanism experiences a torque due to the reel, that is impeded by the rotatable mounting to the spring unit in such a way that the triggering mechanism initially does not rotate jointly with the reel about the axis of rotation of the reel, but about the eccentric pivot.

Preferably the spring unit is further adapted to apply a return force to the triggering mechanism to move the triggering mechanism from the triggering position into the operative position. This embodiment makes use of the realization that a return force applied to the triggering mechanism by the spring unit moves it back into the operative position in a simple and functional manner without requiring additional structural space. Accordingly clamping and release of the belt by the clamping unit which is actuated by the triggering mechanism is effected reversibly.

According to an advantageous embodiment of the invention the triggering mechanism is a sensor-actuatable triggering mechanism which is connected in signal-conducting relationship to the reel and the arresting unit and is adapted to actuate the clamping unit when it receives a signal indicating that a torque is acting on the reel in the negative direction of rotation and/or the reel is arrested by the arresting unit. It is accordingly possible substantially to dispense with mechanical components which are susceptible to wear. Sensors like for example rotary encoders or other optical sensors in that case represent inexpensive and low-maintenance components.

According to another advantageous embodiment of the invention the retractor restraint system further includes a coupling unit adapted to couple the triggering mechanism to the clamping unit. Such a coupling unit permits transmission or diversion of the movement of the triggering mechanism for actuation of the clamping unit so that it can be arranged individually and appropriately in terms of structural space at the housing. Accordingly the triggering mechanism can further be arranged adjacent to the reel and the arresting unit and the coupling unit can couple the triggering mechanism to the clamping unit without requiring a limitation in respect of the design diversity.

Preferably the coupling unit includes a rotatably mounted coupling portion and a lever unit coupled to the clamping unit, wherein the coupling portion in the triggering position can be brought into engagement with the triggering mechanism and is adapted to couple the lever unit to the triggering mechanism and guide it in its movement. Accordingly a rotatably mounted coupling portion is brought into engagement in the triggering position with the triggering mechanism, preferably in positively locking relationship, so that it is possible to transmit the movement of the triggering mechanism from the operative into the triggering position by the coupling portion to the lever unit, the lever unit being guided in its movement by the coupling portion and the coupling portion preferably being adapted to convert the pivotal movement performed by the triggering mechanism about the eccentric pivot into a linear movement of at least a portion of the lever unit.

Preferably at least a portion of the lever unit is mounted to the coupling portion moveably in a plane perpendicular to the axis of rotation and the coupling portion is adapted to move at least a portion of the lever unit in a first direction to bring the lever unit into engagement with a gear coupled to the reel, and wherein the gear is adapted to move at least a portion of the lever unit in a second direction to actuate the clamping unit. Accordingly at least a portion of the lever unit can be brought into engagement with a gear which is associated with or coupled to the reel in order to use the predefined rotary movement which the reel performs by virtue of the resilient coupling to the arresting unit by the spring unit and converts it into a relative movement at least of a portion of the lever unit in order to actuate the clamping unit.

Further preferably the retractor restraint system further includes a return element adapted to apply a return force to the coupling unit. Accordingly the coupling unit can be moved reversibly by the return force into a basic position in which it can again be brought into engagement with the triggering mechanism to actuate the coupling unit.

According to an advantageous embodiment of the invention the arresting unit has a housing portion having an external tooth arrangement and an arresting portion cooperating with the external tooth arrangement, wherein the housing portion is mounted rotatably and coupled to the reel and the arresting portion can be brought into engagement with the external tooth arrangement to arrest the reel. Accordingly the reel can be arrested as soon as the distal ends of the belt are coupled to the wheelchair. Consequently, when the wheelchair is being pushed into the vehicle the belt can be wound on in the positive direction of rotation even in the arrested state. It is solely rotation of the belt reel in the negative direction of rotation that is blocked so that even if the wheelchair is suddenly let go as it is being pushed into the vehicle the belt is reliably blocked to prevent unwinding from the reel.

Preferably in that case the external tooth arrangement is designed in the manner of a ratchet. In accordance with the invention the term designed in accordance with a ratchet is used to mean that the teeth are respectively arranged inclinedly relative to the radial direction of the gear so that the engagement means blocks a movement of the housing portion in the negative direction of rotation and permits rotation of the housing portion in the positive direction. Accordingly the reel which is coupled to the housing portion is reliably blocked in the negative direction of rotation in the arrested state.

According to an advantageous embodiment of the invention the spring unit includes a spring plate coupled to the reel and a spring element coupled to the housing portion. Accordingly the triggering mechanism is coupled to the reel by the spring plate but is impeded in the rotary movement by the spring element which is coupled to the arresting unit in such a way that the triggering mechanism can initially not rotate jointly with the reel about the point of rotation of the reel, but is firstly pivoted about the eccentric pivot relative to the reel and thus passes into the triggering position. It is only in the triggering position that the triggering mechanism can no longer rotate about the eccentric pivot so that at least a portion of the triggering mechanism rotates jointly with the reel in opposition to the spring force of the spring unit.

Preferably the arresting unit includes an actuator for actuating the arresting portion, the actuator being adapted to apply a return force to the arresting portion to release the reel. Accordingly the retractor restraint system remains in the arrested state until the actuator actuates the arresting unit and in that case in particular the arresting portion of the arresting unit to release the external tooth arrangement of the housing portion. Thus the reel is reliably arrested even in the event of a fault in signal transmission or in the event of an accident.

An advantageous embodiment of the invention provides a control unit which can be connected in signal-conducting relationship to the arresting unit to control the actuator. By virtue of such a control unit it is possible for example to use an easily accessible user interface in order to provide an arresting command which is transmitted by the control unit to the arresting unit to control the actuator and arrest the reel.

According to an advantageous embodiment of the invention the reel has a drive which can be connected in signal-conducting relationship to the control unit and is adapted to wind on the belt. By virtue of such a drive which can be connected to the control unit in signal-conducting relationship winding of the belt on to the belt reel can be controlled by the control unit so that handling is simplified.

Preferably the reel is adapted to receive a belt of a length in the region of at least 3 m to 5, preferably a length of about 4 m. Thus a sufficient length is provided to couple the belt to the front part of a wheelchair outside a vehicle. Accessibility of wheelchairs is severely restricted in particular within small vehicles so that it is desirable for the wheelchair to be already coupled to the retractor restraint system outside the vehicle. In that respect a length of up to 4 meters is particularly advantageous, affording good accessibility for coupling the wheelchair to the restraint system.

In further embodiments, the use of a retractor restraint system for securing wheelchairs and/or people in vehicles is provided, in particular a retractor restraint system according to the description above, wherein the retractor restraint system includes: a housing, a retractor reel mounted to the housing rotatably in a positive and a negative direction of rotation for receiving a belt which can be coupled to a wheelchair, wherein the belt can be wound on by a rotation of the reel in the positive direction of rotation and can be unwound by a rotation of the reel in the negative direction of rotation, an arresting unit for arresting the reel to prevent rotation in the negative direction of rotation in an operating state of the retractor restraint system, a clamping unit arranged at the housing for releasably clamping fast the belt unwound from the reel, and a triggering mechanism for actuation of the clamping unit, and the triggering mechanism can be coupled to the arresting unit and the reel in such a way that the clamping unit is actuated when a torque acts on the reel in the negative direction of rotation and the reel is arrested by the arresting unit.

In yet another embodiment, a method of securing wheelchairs and/or people in vehicles by a retractor restraint system is provided, in particular a retractor restraint system according to the description above, wherein the retractor restraint system includes: a housing, a retractor reel mounted to the housing rotatably in a positive and a negative direction of rotation for receiving a belt which can be coupled to a wheelchair, wherein the belt can be wound on by a rotation of the reel in the positive direction of rotation and can be unwound by a rotation of the reel in the negative direction of rotation, an arresting unit for arresting the reel to prevent rotation in the negative direction of rotation in an operating state of the retractor restraint system, a clamping unit arranged at the housing for releasably clamping fast the belt unwound from the reel, and a triggering mechanism which can be coupled to the arresting unit and the reel for actuation of the clamping unit, wherein the method includes the steps: unwinding the belt by a rotation of the reel in the negative direction of rotation, connecting the distal end of the belt to a wheelchair, arresting the reel to prevent rotation in the negative direction of rotation, positioning the wheelchair in the vehicle, winding the belt on by a rotation of the reel in the positive direction of rotation, and actuating the clamping unit by the triggering mechanism when a torque acts on the reel in the negative direction of rotation and the reel is arrested by the arresting unit.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

Figure 1:
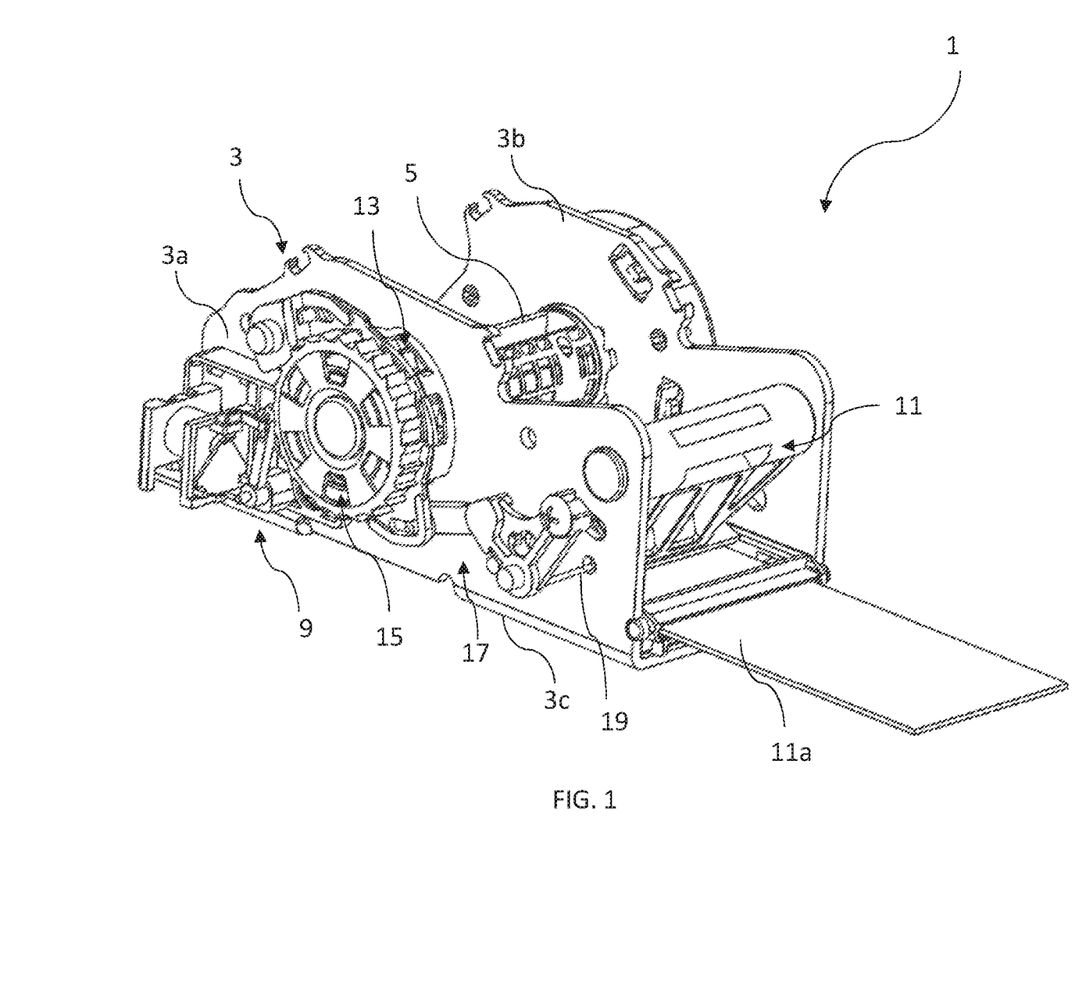
FIG. 1 is a perspective view of a retractor restraint system according to an embodiment of the invention.

FIG. 1 shows a perspective view of the retractor restraint system according to embodiments of the invention.

The retractor restraint system 1 includes a housing 3 in which a retractor reel 5 is mounted rotatably in a positive direction of rotation and in a negative direction of rotation.

The housing 3 includes two spaced housing walls 3a, 3b oriented in mutually parallel relationship and a housing bottom 3c. It is preferably made from metal, steel or strong plastic.

A belt 7 can be wound on the retractor reel 5, being shown here only in the unwound region of the belt 7 for better clarity of the drawing.

The reel 5 can be arrested by an arresting unit 9 in the negative (unwinding) direction of rotation.

The retractor restraint system 1 further includes a clamping unit 11 for clamping fast the belt 7 in that unwound region, a triggering mechanism 13 for actuating the clamping unit 11 and a spring unit 15 for resiliently coupling the reel 5 to the arresting unit 9.

For coupling the triggering mechanism 13 to the clamping unit 11 the retractor restraint system 1 has a coupling unit 17 and further a return element 19 for applying a return force to the coupling unit 17 for releasing the clamping unit 11.

The clamping unit 11 is mounted partially pivotably by a mounting which preferably has a pin to the housing 3 and in particular the housing sides 3a, 3b. By virtue of a pivotal movement of the clamping unit in the direction of the belt 7 a clamping portion 11a which for example can be in the form of a substantially flat metal portion can be pressed on to the belt 7 and clamp it fast in frictionally locking relationship. In that respect it has a self-clamping action, that is to say the clamping force increases with an increasing pulling force on the belt 7.

Figure 2:
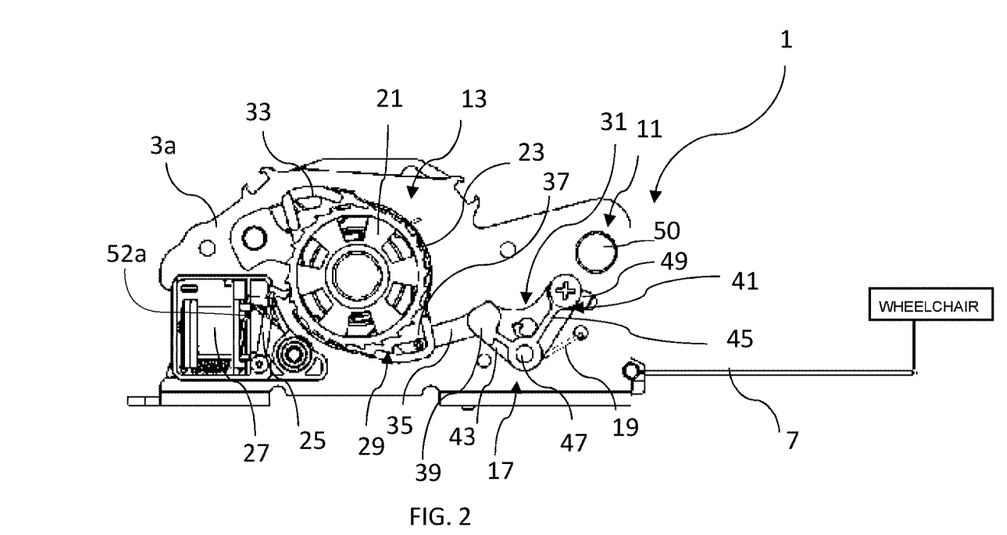
FIG. 2 is a front side view of the retractor restraint system of FIG. 1.

As the side view of the retractor restraint system 1 shown in FIG. 2 particularly illustrates the arresting unit 9 includes a housing portion 21 mounted rotatably to the housing 3, with an external tooth arrangement 23 and an arresting portion 25.

The housing portion 21 with the external tooth arrangement 23 is designed in the manner of a ratchet and can be brought into engagement with the external tooth arrangement 23. In this arrangement the arresting portion 25 can be brought into engagement with the external tooth arrangement 23 in such a way that rotation of the housing portion 21 in the negative direction is prevented or blocked and a positive direction of rotation is enabled.

The arresting unit 9 further includes an actuator 27 for actuating the arresting portion 25. The actuator 27 is adapted to move the arresting portion 25 away from the housing portion 21 against a spring force in order to release the reel 5 again.

The triggering mechanism 13 is disposed within the housing portion 21 and is connected to the coupling unit 17.

The spring unit 15 is disposed within the housing portion 21 and couples the arresting unit 9 to the reel 5 by way of the housing portion 21.

The coupling unit 17 includes a coupling portion 29 and a lever unit 31.

The coupling portion 29 is mounted rotatably to the housing 3 and can be brought into engagement with the triggering mechanism 13 by movement of the triggering mechanism 13 into the triggering position. The coupling means 29 can be brought into engagement with the lever unit 31 in a triggering state of the triggering mechanism when a negative torque acts on the reel 5 and the reel is arrested by the arresting unit.

For that purpose the coupling portion 29 has at least one guide 33 which is in engagement with a part of the lever unit 31 and guides it in its movement.

The lever unit 31 includes a lever 35 having a pin 37 which is in engagement with the guide 33 and is guided or mounted moveably therein. The lever 35 is coupled to a pivotal lever 41 by way of a hinge joint 39.

The pivotal lever 41 includes a first limb 43 which is coupled to the lever 35 by way of the joint 39 and a second limb 45 coupled to the clamping unit 11. The pivotal lever 41 is rotatable about a pivot point 47 or is mounted pivotably thereat, wherein the distal end of the limb 45 is in engagement with a guide 49 on the housing 3 and is guided in the movement.

The clamping unit 11 is coupled to the distal end of the limb 45 and is mounted pivotably or rotatably about a pivot axis 50 on the housing 3. The pivot axis 50 is in engagement with both spaced housing sides 3a, 3b oriented in mutually parallel relationship.

Figure 3:
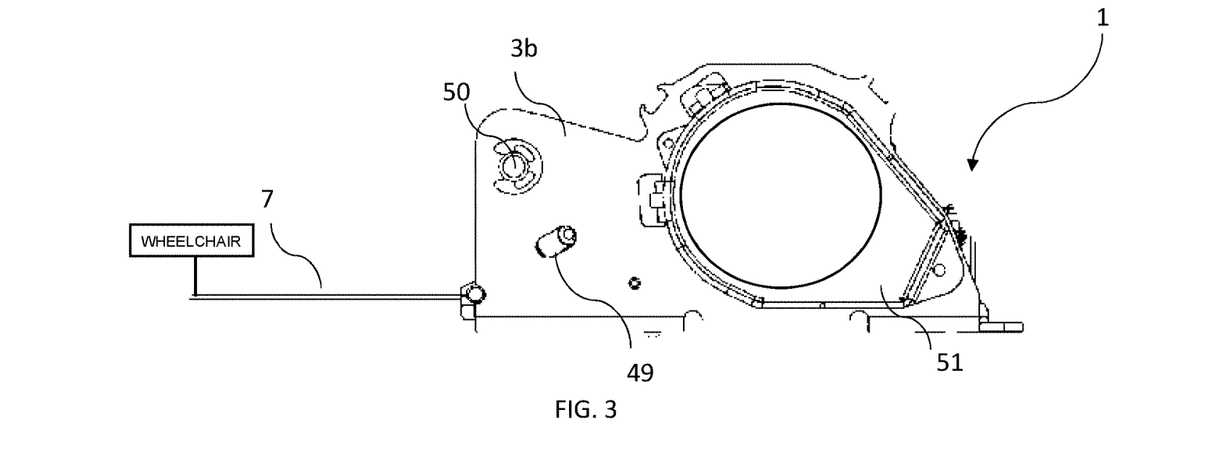
FIG. 3 is a rear side view of the retractor restraint system of FIG. 1.

As in particular the side view of the retractor restraint system 1 shown in FIG. 3 illustrates the guide 49 is provided on the two housing walls 3a, 3b and is in engagement with the clamping unit 11 at both sides.

At the housing side 3b the housing 3 has a housing flap 51 which closes off access to the reel 5 to avoid injuries.

Figure 4:
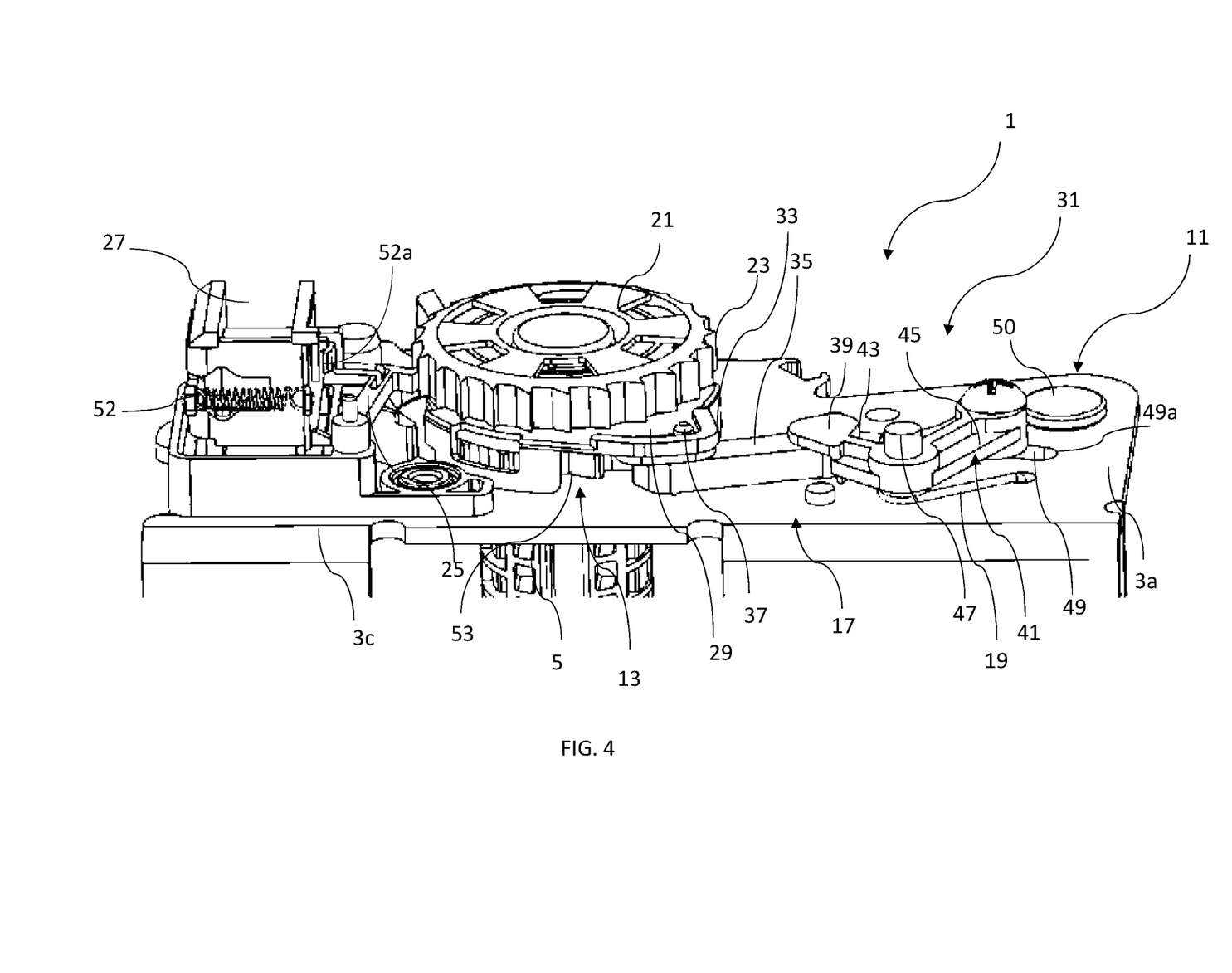
FIG. 4 is a second perspective view of the retractor restraint system of FIG. 1.

The perspective view of the retractor restraint system 1 according to embodiments of the invention as shown in FIG. 4 illustrates in particular the arresting unit 9. The arresting unit 9, as already shown in FIG. 2, includes the housing portion 21 with external tooth arrangement 23 and the arresting portion 25 which can be brought into engagement with the external tooth arrangement 23.

The arresting unit 9 further includes the actuator 27 for actuating the arresting portion 25 in order to release the reel 5 again and a return unit 52.

The return unit 52 includes a tension spring and a pivotal plate 52a which is coupled to the tension spring and the arresting portion 25 and is mounted pivotably about an axis. The tension spring and the pivotal plate 52a of the return unit 52 are coupled together in such a way that the pivotal plate is pivoted about its axis by the spring force and in so doing brings the arresting portion into engagement with the external tooth arrangement 23. In addition the actuator 27 is coupled to the plate 52a and pivots the plate 52a about its axis in such a way that the arresting portion 25 and the external tooth arrangement are brought out of engagement.

In addition FIG. 4 shows that the lever 35 of the lever unit 31 is arranged in a plane perpendicularly to the axis of rotation of the reel 5 between the housing 3 and the coupling portion 29 and is guided in its movement by the guide 33. The coupling portion 29 guides the lever 35 in the direction of a gear 53 coupled to the reel 5 to bring the lever 35 into engagement with the gear 53.

The rotation of the gear 53 in the negative direction of rotation leads to a movement of the lever 35 in the direction of the clamping unit 11.

That relative movement is transmitted by the lever 35 by the hinged connection by the joint 39 to the pivotal lever 41. The pivotal lever 41 is thereby pivoted about its pivot point 47 in such a way that at its end it moves in the guide 49 towards an abutment 49a. By virtue of the movement of the pivotal lever 41 towards the abutment 49a the clamping unit 11 pivots about the pivot axis 50 and is pressed on to the belt 7 so that the belt 7 is clamped fast by the clamping unit 11.

Figure 5:
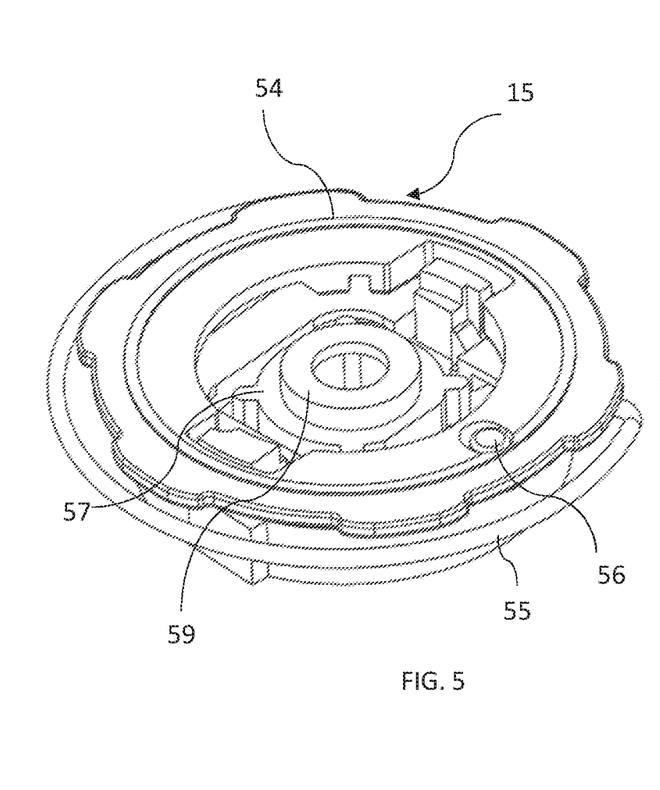
FIG. 5 is a perspective view of a spring unit and a triggering mechanism of the retractor restraint system of FIG. 1.
Figure 6:
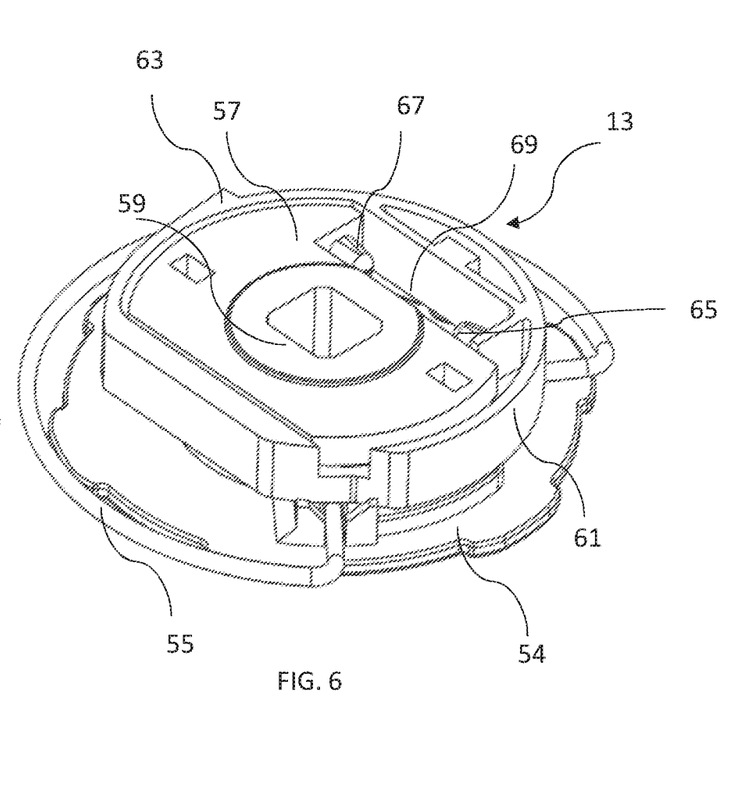
FIG. 6 is a perspective view of another spring unit and another triggering mechanism of the retractor restraint system of FIG. 1.

FIGS. 5 and 6 respectively show a perspective view of the spring unit 15 and the triggering mechanism 13 as a first and a second perspective view.

The spring unit 15 includes a spring plate 54 and a spring element 55 coupled to the spring plate.

The spring plate 54 is adapted to be coupled to the reel (not shown) and the spring element 55 is adapted to be brought into engagement with the arresting unit and in particular the housing portion (not shown). In this respect the spring element 55 bears at least partially against an inner periphery of the housing portion.

Provided on the spring plate 54 is an eccentric pivot point 56 at which the triggering unit (not shown) can be rotatably mounted.

The restraint system 1 further includes a reel plate 57 which has a push-in connection 59 for being brought into positively locking engagement with the reel 5, as in particular FIG. 6 shows.

At the reel side the push-in connection 59 is in the form of a square push-in connection in order to be brought into engagement with a corresponding push-in portion of the reel 5.

The triggering mechanism 13 includes a triggering plate 61 having a projection 63 adapted to be brought into engagement with the coupling unit 17.

The reel plate 57 can be brought into engagement with play with a triggering plate 61 of the triggering mechanism 13. The triggering plate 61 includes substantially the reel plate 57, wherein the triggering plate 61 is mounted moveably relative to the reel plate 57. The reel plate 57 and the triggering plate 61 respectively have a guide portion 65, 67 which can be brought into engagement with a compression spring (not shown) at the position 69.

The triggering plate 61 is mounted rotatably about the eccentric pivot point 56 so that the reel is coupled to the spring plate 54 by way of the coupling, with play, of the reel plate 57 and the triggering plate 61.

Figure 7:
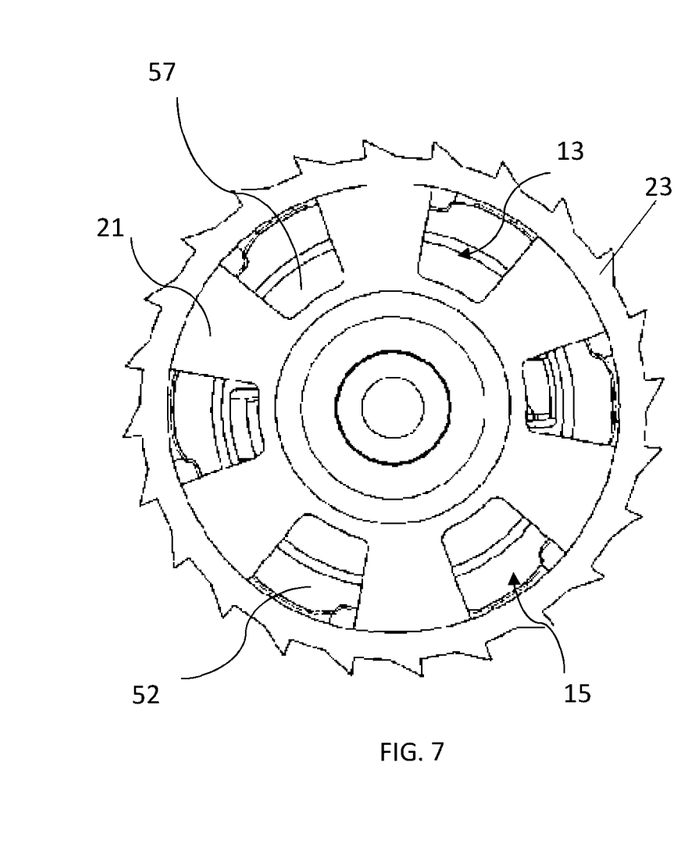
FIG. 7 is a detail view of a housing portion of the retractor restraint system of FIG. 1.
Figure 8:
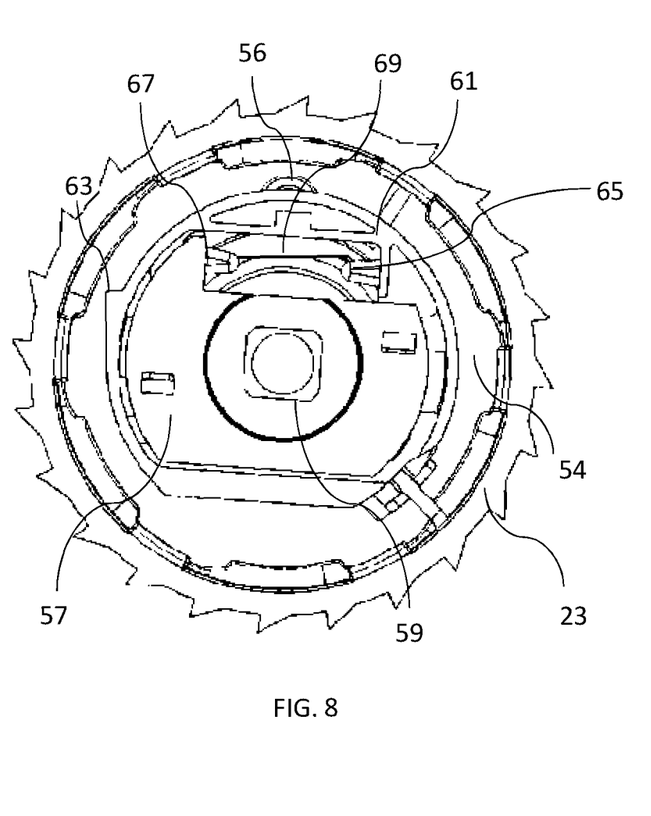
FIG. 8 is a detail view of a housing portion and a triggering mechanism arranged therein of the retractor restraint system of FIG. 1.

FIGS. 7 and 8 show detail views of the housing portion 21 and the arrangement of the spring unit 15 as well as the triggering mechanism 13 in the housing portion 21. The housing portion 21 is in the form of a substantially wheel-shaped housing open at one side. The external tooth arrangement 23 is provided at the outer periphery of the housing portion 21. The external tooth arrangement 23 extends, in the manner of a ratchet, inclinedly relative to the radial direction of the housing portion 21 in such a way that, in the arrested state, rotation in the negative direction is blocked and rotation in the positive direction is enabled for winding on the belt.

As in particular FIG. 8 shows the spring plate 54 is disposed within the housing portion 21 and is at least portion-wise in contact with an inner periphery of the housing portion 21. In this case the spring plate 54 is guided in its movement by the housing portion 21 in a pre-defined region in which it is rotatable jointly with the reel 5 relative to the arrested housing portion 21.

The triggering plate 61 is mounted rotatably on the housing portion 21 at the eccentric pivot point 56.

The reel plate 57 is mounted with play in the triggering plate 61. The reel plate 57 is coupled to the reel by the push-in connection 59.

Figure 9:
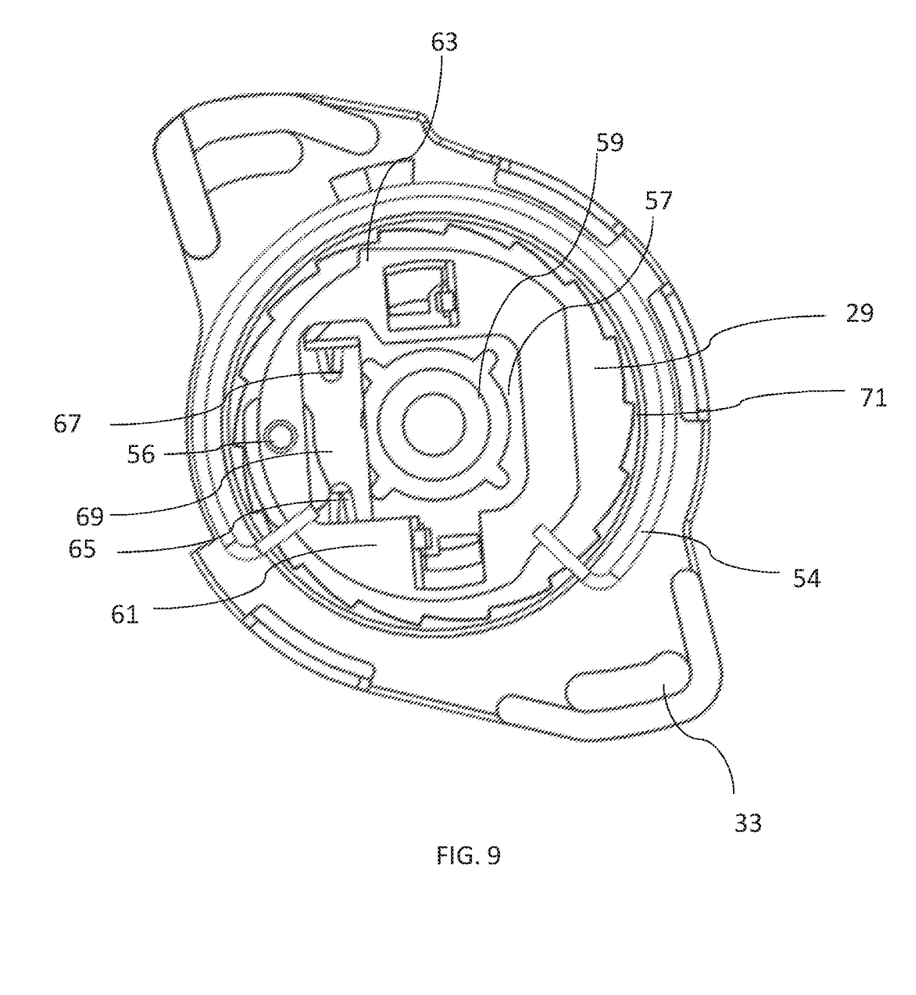
FIG. 9 is a detail view of a housing portion, a spring unit, a triggering mechanism and a coupling portion of a coupling mechanism of the retractor restraint system of FIG. 1.

FIG. 9 shows the coupling portion 29 of the coupling unit 17. The coupling portion 29 is adapted to bring the triggering mechanism into engagement with the lever unit 31 to actuate the clamping unit 11.

The coupling portion 29 is in the form of a disk which is mounted to the housing 3 rotatably about the point of rotation of the reel 5. The coupling portion 29 has two mutually opposite guides 33 in the form of slots and an internal tooth arrangement 71 with which the projection 63 of the triggering plate 61 can be brought into engagement in the triggering position.

The mode of operation of the triggering mechanism 13 and the spring unit 15 and the method are described hereinafter by way of example with reference to FIGS. 1 to 9.

When a negative torque acts on the reel 5 in the arrested state the reel plate 57 moves relative to the arrested housing portion 21, in which case the rotation is transmitted with play to the triggering plate 61.

The triggering plate 61 coupled to the spring plate 54 by way of the eccentric pivot point 56 is coupled to the arresting unit 9 by the spring unit 15 in such a way that it initially does not perform that rotary movement and by virtue of the slight resistance firstly pivots about the eccentric pivot point 56 relative to the reel plate 57 so that the projection 63 moves relative to the reel plate 57 to come into engagement with the coupling unit 17.

In the triggering state when the projection 63 is in engagement with the internal tooth arrangement 71 the triggering plate 61 cannot be further pivoted so that the rotation is transmitted to the spring plate 54 which then rotates jointly with the reel 5 in a predefined region against the spring force of the spring element 55 relative to the housing portion 21.

In addition in that state the rotation of the reel 5 is transmitted against the spring force of the spring element 55 to the coupling portion 29 so that same rotates about the point of rotation of the reel 5. By virtue of that rotation the pin 37 of the lever 35 of the lever unit 31 is moved in the direction of the gear 53 to come into engagement therewith. In that situation the pin 37 is moved upwardly relative to the base surface 3c of the housing. The pin 37 is then moved by the rotation of the gear 53 in the negative direction of rotation within the guide 33 relative to the base surface 3c of the housing towards the right, whereby the pivot lever 41 is pivoted and the clamping unit 11 is actuated.

The compression spring at the location of installation 69, the return element 19 and the spring element 55 are in that case adapted, after actuation of the clamping unit 11, in a state in which no torque acts on the reel 5 in the negative direction of rotation, to displace the triggering mechanism 13, the spring unit 15 and the coupling unit 17 into the operative state thereof again by application of a return force.

Figure 10:
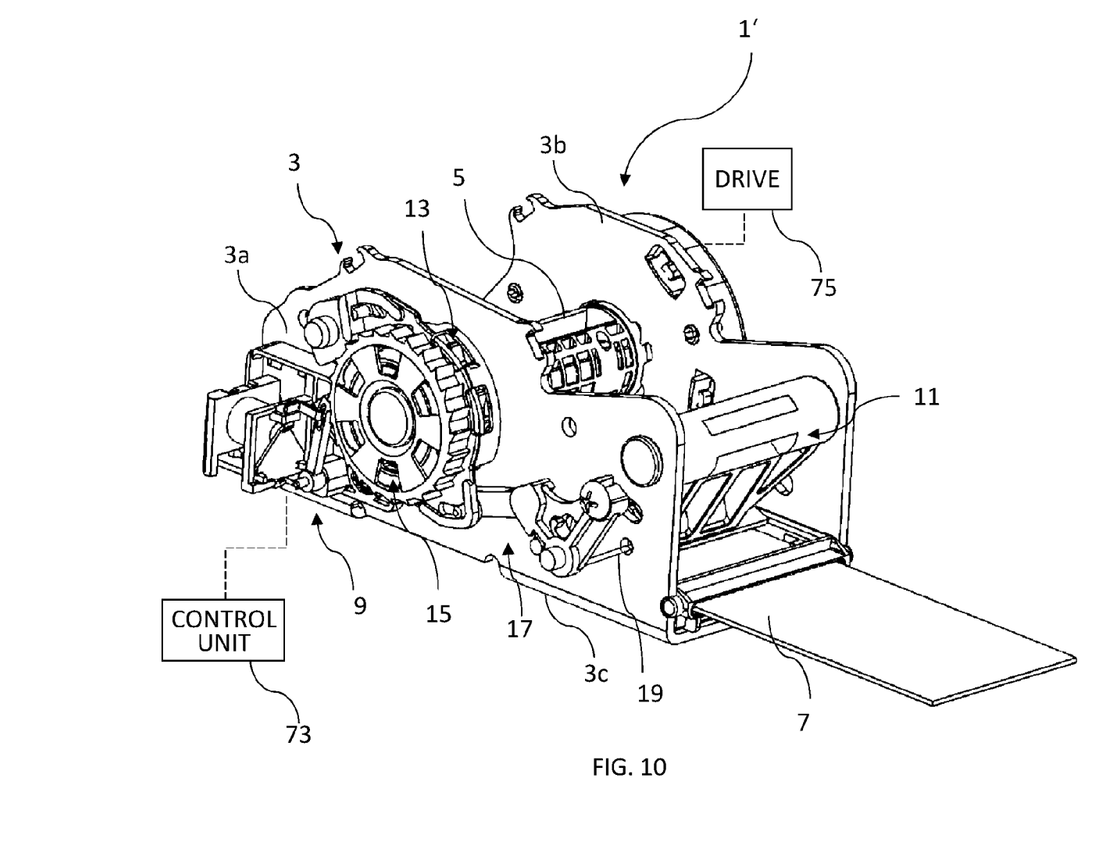
FIG. 10 is a perspective view of a retractor restraint system according to an alternative embodiment of the invention.

FIG. 10 shows an alternative embodiment of the retractor restraint system 1' according to embodiments of the invention in a perspective view.

The retractor restraint system 1' includes a housing 3 in which a retractor reel 5 is mounted rotatably in a positive direction of rotation and in a negative direction of rotation.

The housing 3 includes two spaced and mutually parallel housing walls 3a, 3b and a housing bottom 3c. A belt 7 can be wound on the retractor reel 5, the belt 7 being shown here only in the unwound region thereof for the sake of improved clarity of the drawing.

The reel 5 can be arrested in the negative direction of rotation by an arresting unit 9.

The retractor restraint system 1' further includes a clamping unit 11 for clamping the belt 7 fast in the unwound region thereof, a triggering mechanism 13 for actuating the clamping unit 11 and a spring unit 15 for resiliently coupling the reel 5 to the arresting unit 9.

For coupling the triggering mechanism 13 to the clamping unit 11 the retractor restraint system 1' has a coupling unit 17 and also a return element 19 for applying a return force to the coupling unit 17 for releasing the clamping unit 11.

The retractor restraint system 1' further includes a control unit 73 which can be connected to the arresting unit 9 in signal-conducting relationship and in particular to an actuator 27 associated with the arresting unit to arrest the reel 5.

The reel 5 has a drive 75 which can be connected to the control unit 73 in signal-conducting relationship and is adapted to wind on the belt 7.

The examples and description in relation to FIGS. 2 to 9 also apply to the embodiment of the retractor restraint system 1' according to embodiments of the invention as shown in FIG. 10.

The embodiments described above are only descriptions of preferred embodiments of the present invention, and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

LIST OF REFERENCES USED 1 retractor restraint system
3 housing
5 retractor reel
7 belt
9 arresting unit
11 clamping unit
11a clamping portion
13, 13' triggering mechanism
15 spring unit
17 coupling unit
19 return element
21 housing portion
23 external tooth arrangement
25 arresting portion
27 actuator
29 coupling portion
31 lever unit
33 guide
35 lever
37 pin
39 joint
41 angle lever
43 first limb
45 second limb
47 lever pivot point
49 guide
50 pivot axis
51 housing flap
52 return unit
52a pivot plate
53 reel gear
54 spring plate
55 spring element
56 eccentric pivot point
57 reel plate
59 push-in connection
61 triggering plate
63 projection
65 first guide pin
67 second guide pin
69 location of installation of the compression spring
71 internal tooth arrangement
73 control unit
75 drive

What is claimed is:

1. A retractor restraint system for securing wheelchairs and/or people in vehicles, comprising:
a housing;
a retractor reel mounted to the housing rotatably to enable a positive direction of rotation and a negative direction of rotation, the retractor reel configured for receiving a belt which can be coupled to a wheelchair, wherein the belt can be wound on by a rotation of the reel in the positive direction of rotation and can be unwound by a rotation of the reel in the negative direction of rotation;
an arresting unit for arresting the reel to prevent rotation in the negative direction of rotation in an operating state of the retractor restraint system;
a clamping unit arranged at the housing for releasably clamping fast the belt unwound from the reel; and
a triggering mechanism for actuation of the clamping unit, wherein the triggering mechanism is coupled to the arresting unit and the reel in such a way that the clamping unit is actuated when a torque acts on the reel in the negative direction of rotation and the reel is arrested by the arresting unit,
wherein the triggering mechanism is a mechanically actuatable triggering mechanism which is moveable from an operative position into a triggering position to actuate or release the clamping unit, respectively, and
wherein the retractor restraint system further comprises a spring unit for resiliently coupling the reel to the arresting unit so that the reel in an arrested state is rotatable in a predefined range in the negative direction of rotation, and
wherein the triggering mechanism is coupled with clearance to the reel in such a way that the triggering mechanism is moved relative to the reel from the operative position into the triggering position when the reel rotates in the arrested state in the predefined range in the negative direction of rotation.

2. The retractor restraint system of claim 1, wherein the triggering mechanism is mounted to the spring unit rotatably about an eccentric pivot and is moved by a rotation about the eccentric pivot into the triggering position when the reel rotates in the arrested state in the predefined range in the negative direction of rotation.

3. The retractor restraint system of claim 1, wherein the spring unit is further adapted to apply a return force to the triggering mechanism to move the triggering mechanism from the triggering position into the operative position.

4. The retractor restraint system of claim 1, further comprising:
a coupling unit adapted to couple the triggering mechanism to the clamping unit.

5. The retractor restraint system of claim 4, wherein the coupling unit includes a rotatably mounted coupling portion and a lever unit coupled to the clamping unit, and wherein the coupling portion in a triggering position can be brought into engagement with the triggering mechanism and is adapted to couple the lever unit to the triggering mechanism, the movement of the lever unit being guided by the coupling portion.

6. The retractor restraint system of claim 5, wherein at least one lever of the lever unit is mounted to the coupling portion moveably in a plane perpendicular to an axis of rotation and the coupling portion is adapted to move the at least one lever in a first direction to bring the lever unit into engagement with a gear coupled to the reel, and wherein the gear is adapted to move the at least one lever in a second direction to actuate the clamping unit.

7. The retractor restraint system of claim 4, further comprising:
a return element adapted to apply a return force to the coupling unit.

8. The retractor restraint system of claim 1, wherein the arresting unit has a housing portion having an external tooth arrangement and an arresting portion cooperating with the external tooth arrangement, and wherein the housing portion is mounted rotatably and coupled to the reel and the arresting portion can be brought into engagement with the external tooth arrangement to arrest the reel.

9. The retractor restraint system of claim 8, wherein the spring unit includes a spring plate coupled to the reel and a spring element coupled to the housing portion.

10. The retractor restraint system of claim 8, wherein the arresting unit includes an actuator for actuating the arresting portion, the actuator being adapted to apply a return force to the arresting portion to release the reel.

11. The retractor restraint system of claim 10, further comprising:
a control unit which can be connected in signal-conducting relationship to the arresting unit to control the actuator.

12. The retractor restraint system of claim 11, wherein the reel has a drive which can be connected in signal-conducting relationship to the control unit and is adapted to wind on the belt.

13. The retractor restraint system of claim 1, wherein the reel is adapted to receive a belt of a length of about 3 m to 5 m.

14. A method of securing wheelchairs and/or people by a retractor restraint system, the method comprising:
unwinding a belt by a rotation of a reel in a negative direction of rotation,
connecting a distal end of the belt to a wheelchair,
arresting the reel to prevent rotation in the negative direction of rotation,
positioning the wheelchair proximate to the retractor restraint system,
winding the belt on by a rotation of the reel in a positive direction of rotation, and actuating a clamping unit by a triggering mechanism when a torque acts on the reel in the negative direction of rotation and the reel is arrested by an arresting unit,
wherein the triggering mechanism is a mechanically actuatable triggering mechanism which is moveable from an operative position into a triggering position to actuate or release the clamping unit, respectively, and
wherein the retractor restraint system further comprises a spring unit for resiliently coupling the reel to the arresting unit so that the reel in an arrested state is rotatable in a predefined range in the negative direction of rotation, and
wherein the triggering mechanism is coupled with clearance to the reel in such a way that the triggering mechanism is moved relative to the reel from the operative position into the triggering position when the reel rotates in the arrested state in the predefined range in the negative direction of rotation.

* * * * *